US012626362B2

(12) United States Patent
Xiang et al.

(10) Patent No.: US 12,626,362 B2
(45) Date of Patent: May 12, 2026

(54) METHODS AND SYSTEMS FOR EHNANCED OPHTHALMIC VISUALIZATION

(71) Applicant: Alcon Inc., Fribourg (CH)

(72) Inventors: Qing Xiang, Irvine, CA (US); John Park, Irvine, CA (US); Ying Zhu, Irvine, CA (US); Jonathan Che-Pin Chang, St. Louis, MO (US)

(73) Assignee: Alcon Inc., Fribourg (CH)

( * ) Notice: Subject to any disclaimer, the term of this patent is extended or adjusted under 35 U.S.C. 154(b) by 378 days.

(21) Appl. No.: 18/475,396

(22) Filed: Sep. 27, 2023

(65) Prior Publication Data

US 2024/0112333 A1     Apr. 4, 2024

Related U.S. Application Data

(60) Provisional application No. 63/377,297, filed on Sep. 27, 2022.

(51) Int. Cl.
| | |
|---|---|
| *G06K 9/00* | (2022.01) |
| *A61K 35/12* | (2015.01) |
| *G06T 1/00* | (2006.01) |
| *G06T 7/00* | (2017.01) |

(52) U.S. Cl.
CPC .......... *G06T 7/0012* (2013.01); *G06T 1/0007* (2013.01); *G06T 2207/30041* (2013.01)

(58) Field of Classification Search
CPC ......... A61B 3/0025; A61B 3/102; A61B 3/12; A61B 3/0008; A61B 3/0058; A61B 3/1025; A61B 3/1225; A61B 3/14; A61B 3/154; A61B 3/0041; A61B 3/1241; A61B 5/14555; G06T 2207/30041;
(Continued)

(56) References Cited

U.S. PATENT DOCUMENTS

| | | | |
|---|---|---|---|
| 7,246,905 | B2 | 7/2007 | Benedikt |
| 9,185,357 | B2 | 11/2015 | Boccara |
| 12,303,197 | B2 * | 5/2025 | Leahy ..................... G06T 7/571 |

(Continued)

FOREIGN PATENT DOCUMENTS

| | | |
|---|---|---|
| CN | 112816420 A | 5/2021 |
| WO | 9916353 A1 | 4/1999 |

(Continued)

OTHER PUBLICATIONS

William R. Johnson, Snapshot hyperspectral imaging in ophthalmology, Journal of Biomedical Optics, 12 (1), 014036_1-7, 2007.
(Continued)

*Primary Examiner* — Seyed H Azarian

(57) ABSTRACT

In certain embodiments, a system, a computer-implemented method, and computer-readable medium are disclosed for enhanced ophthalmic visualization. A plurality of images corresponding to different portions of the electromagnetic spectrum are obtained and combined, such as by pixel-wise subtraction to obtain a combined image. The images may be weighted with weights selected to enhance visualization of features, such as layers of the retina or features corresponding to pathologies. The combined image may be processed, such as by a machine learning model, to extract features.

16 Claims, 6 Drawing Sheets

(58) Field of Classification Search
CPC ......... G06T 2207/10101; G06T 7/0012; G06T 2207/20081; G06T 7/0014; G06T 2200/24
USPC ....... 382/100, 128–134, 155, 162, 168, 173, 382/181, 254, 276, 312; 356/456; 600/176; 348/77
See application file for complete search history.

(56) References Cited

U.S. PATENT DOCUMENTS

| | | |
|---|---|---|
| 2004/0085542 A1* | 5/2004 | Soliz ..................... G01J 3/2823 356/456 |
| 2006/0140497 A1 | 6/2006 | Kondo et al. |
| 2007/0156021 A1* | 7/2007 | Morse .................. A61B 1/0692 600/176 |
| 2010/0085537 A1 | 4/2010 | Ramella-roman et al. |
| 2012/0065518 A1 | 3/2012 | Mangoubi |
| 2013/0128227 A1 | 5/2013 | Cui et al. |
| 2014/0002793 A1 | 1/2014 | Hogan |
| 2014/0276025 A1 | 9/2014 | Durbin |
| 2014/0300864 A1 | 10/2014 | Fukuma |
| 2015/0015692 A1* | 1/2015 | Smart ................... G01J 3/2823 348/77 |
| 2016/0278678 A1 | 9/2016 | Valdes et al. |
| 2016/0338588 A1 | 11/2016 | Friedman |
| 2016/0360958 A1 | 12/2016 | Tsuri |
| 2017/0042464 A1 | 2/2017 | Verdooner |
| 2017/0059408 A1 | 3/2017 | Krner et al. |
| 2017/0176336 A1 | 6/2017 | Dimitriadis et al. |
| 2017/0297144 A1 | 10/2017 | Nakanishi |
| 2018/0136486 A1 | 5/2018 | Macnamara |
| 2019/0298170 A1 | 10/2019 | Artal Soriano et al. |
| 2019/0343384 A1 | 11/2019 | Plaian |
| 2020/0179168 A1* | 6/2020 | Kelleher .............. A61F 9/00718 |
| 2021/0045672 A1* | 2/2021 | Jia ........................ A61B 3/1233 |
| 2021/0169324 A1 | 6/2021 | Tripathi et al. |
| 2021/0297560 A1* | 9/2021 | Luna .................... H04N 13/296 |
| 2022/0151568 A1 | 5/2022 | Yao |
| 2022/0157470 A1 | 5/2022 | Sylvestre |
| 2022/0160228 A1 | 5/2022 | Leahy et al. |
| 2022/0225877 A1 | 7/2022 | Shiba et al. |
| 2022/0240779 A1 | 8/2022 | Peyman |
| 2022/0260413 A1 | 8/2022 | Perruchot et al. |
| 2023/0018494 A1 | 1/2023 | Gribble et al. |
| 2024/0415383 A1 | 12/2024 | Shaked et al. |
| 2025/0150564 A1 | 5/2025 | Mizutani et al. |

FOREIGN PATENT DOCUMENTS

| | | |
|---|---|---|
| WO | 2015023990 A1 | 2/2015 |
| WO | 2020047594 A1 | 3/2020 |
| WO | 2021151046 A1 | 7/2021 |
| WO | 2022011420 A1 | 1/2022 |
| WO | 2022153320 A1 | 7/2022 |

OTHER PUBLICATIONS

Ayon Dey, Machine learning algorithms: a review, International jurnal of computer science and information technologies, vol. 7, pp. 1174-1179, 2016.

Chen Qingyu et al., Multi-modal, multi-task, multi-attention (M3) deep learning detection of regular pseudodrusen: towards automated accessible classification of age-related macular degeneration, pp. 1-31, 2020URL: https://arxiv.org/abs/2011.05142vl.

Citation: M. Arsalan et al., Segmenting Retinal Vessels Using a Shallow Segmentation Network to Aid Ophthalmic Analysis, Mathematics, vol. 10, p. 1536, 2022.

J. Fhima et al., PVBM: A Python Vasculature Biomarker Toolbox Based on Retinal Blood Vessel Segmentation, Cornell University, 2022.

Sarraf David et al., Retinal pigment epithelial tears in the era of intravitreal pharmacotherapy: risk factors, pathogenesis, prognosis and treatment (an American Ophthalmological Society thesis), American Ophthalmological Society, Transactions, vol. 112, pp. 142-159, 2014.

Yonlong He, et al., Segmenting Diabetic Retinopathy Lesions in Multispecial Images Using Low-Dimensional Spatial-Spectral Matrix Representation, Ieee Juournal of Biomedical and helth informatics, Ieee, Piscataway, NJ, USA, vol. 24, No. 2, pp. 493-502, Apr. 20, 2019.

Yoon Jonghee, @Hyperspectrial Imaging for Clinical Applications@ Biochip Journal, Korean Biochip, Seoul, South Korea, vol. 16, No. 1, Jan. 4, 2022, pp. 1-12.

* cited by examiner

METHODS AND SYSTEMS FOR EHNANCED OPHTHALMIC VISUALIZATION

BACKGROUND

The diagnosis and treatment of many eye disorders requires imaging of a patient's eye. The retina has many intricate features that are imaged to diagnose eye disorders as well as other disorders that cause physiological changes to the retina. An ophthalmoscope may be used to image the retina in order to diagnose eye disorders. When performing ophthalmic surgery, a surgeon typically uses an ophthalmic microscope, such as a digital surgical microscope.

A digital ophthalmic microscope or ophthalmoscope may image the retina using a color (i.e., red, green, and blue) digital camera that captures images of the retina illuminated with a broadband light source (e.g., visible white light).

Multispectral imaging (MSI) is another technique that may be used in an ophthalmic microscope or ophthalmoscope. MSI involves measuring (or capturing) light reflected from the retina at different wavelengths or spectral bands across the electromagnetic spectrum, such as from infrared to ultraviolet wavelengths. MSI may capture more information from the retina that may not be visible through conventional imaging.

It would be an advancement in the art to improve imaging of the retina in order to better diagnose eye disorders and provide a more accurate representation of a patient's eye during eye surgery.

SUMMARY

In certain embodiments, a system is provided that includes one or more processing devices and one or more memory devices coupled to the one or more processing devices. The one or more memory devices store executable code that, when executed by the one or more processing devices, causes the one or more processing devices to receive a plurality of images of an eye of a patient, each image corresponding to a different portion of an electromagnetic spectrum. A combined image is obtained by performing pixel-wise combination of two or more images of the plurality of images. A representation of the combined image is output to a display device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
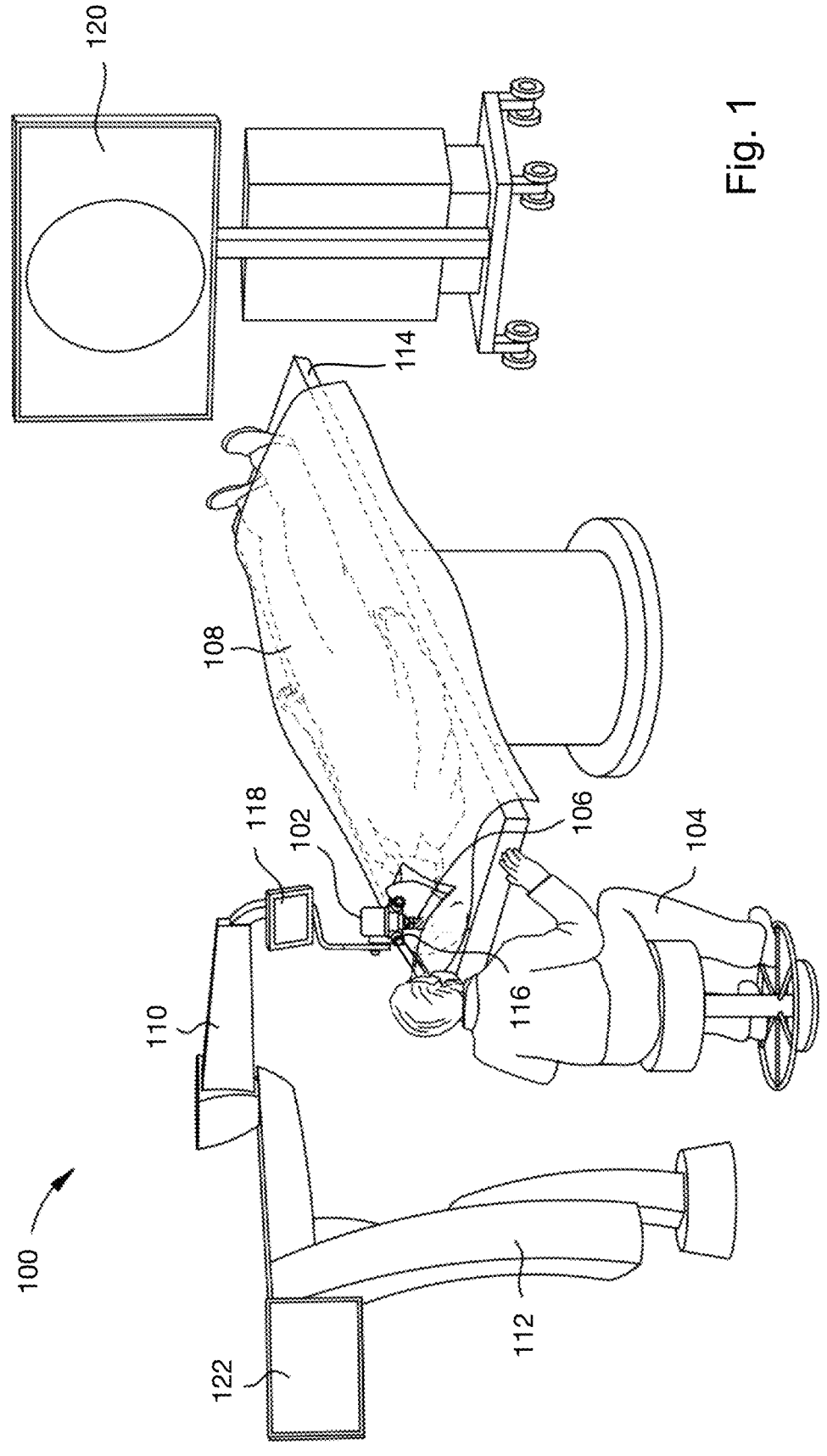
FIG. 1 illustrates an example operating environment in which enhanced ophthalmic visualization may be used in accordance with certain embodiments.

FIG. 1 illustrates an example ophthalmic viewing system 100 in which the enhanced ophthalmic visualization method disclosed herein may be used. The system 100 includes an ophthalmic microscope 102. A surgeon 104 uses the ophthalmic microscope 102 to visualize structures on and in an eye 106 of a patient 108 undergoing a surgery or examination. The microscope 102 is supported on, in this illustration, an adjustable overhead arm 110 of a microscope support pedestal 112. The patient 108 may be supported on an operating table 114. The ophthalmic microscope 102 is movable with the supporting arm 110 in three dimensions so that the surgeon 104 can position the ophthalmic microscope 102 as desired with respect to the eye 106 of the patient 108.

In certain embodiments, the ophthalmic microscope 102 comprises a high resolution, high contrast stereo viewing surgical microscope. The ophthalmic microscope 102 will often include a monocular eyepiece 116 or binocular eyepieces 116, through which the surgeon 104 will have an optically magnified view of the relevant eye structures that the surgeon 104 will need to see to accomplish a given surgery or diagnose an eye condition of the patient 108.

The ophthalmic microscope 102 includes a digital camera and broadband light source for capturing RGB images, an MSI imaging device, and/or other type of imaging device. Digital images captured using the camera may be displayed on a display device within the ophthalmic microscope 102.

The ophthalmic microscope 102 may include two display devices viewable through binocular eyepieces 116 and that display images of the patient's eye 106 that are captured from different viewpoints by two cameras to provide stereoscopic viewing. For example, the ophthalmic microscope 102 may be implemented as the NGENUITY 3D VISUALIZATION SYSTEM provided by Alcon Inc. of Fort Worth, Texas.

Images from the ophthalmic microscope 102 may additionally or alternatively be displayed on one or more display devices. For example, the one or more display devices may include a display device 118 fastened to the supporting arm 110 above the ophthalmic microscope 102. The one or more display devices may include a display device 120 mounted to a cart or other structure. The display device 120 may be large, e.g., at least 48-inch diagonal, to be viewable by the surgeon with the display device 120 positioned at the foot of the operating table 114. The one or more display devices may include a display device mounted to the support pedestal 112. Any of the display devices 118, 120, 122 may be implemented as touch screens for receiving inputs from the surgeon 104 or another operator. The one or more display devices may include a virtual reality headset or other type of three-dimensional viewing modality.

The illustrated ophthalmic viewing system 100 is exemplary only. Other configurations may also be used. For example, an ophthalmoscope may be mounted on a table or other fixture and view the eye of a patient that is seated or standing in front of the ophthalmoscope. The ophthalmoscope may likewise include a camera for capturing RGB images, an MSI imaging device, and/or other type of imaging device. The ophthalmoscope may include two cameras and images from the two cameras may be viewed using two display devices and binocular eye pieces, a virtual reality headset, or other three-dimensional viewing modality.

Figure 2:
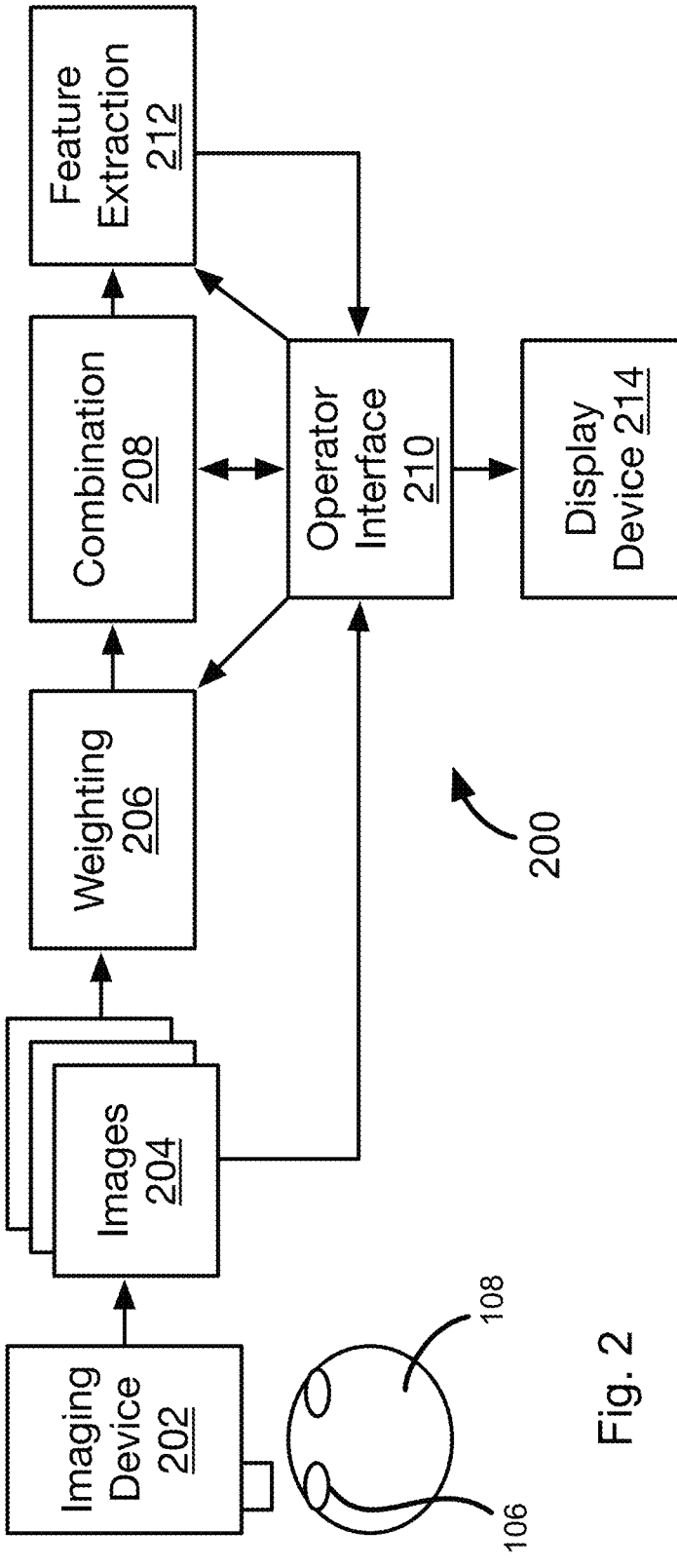
FIG. 2 is a diagram illustrating a system for enhanced ophthalmic visualization in accordance with certain embodiments.

FIG. 2 is a diagram illustrating an ophthalmic visualization system 200 for enhanced ophthalmic visualization in accordance with certain embodiments. The system 200 includes an imaging device 202 having an eye 106 of a patient 108 in a field of view thereof during use, such as the retina of the eye 106. The imaging device 202 may be implemented as an ophthalmic microscope 102, ophthalmoscope, or other imaging device. The imaging device 202 may include a digital camera, such as an RGB camera and broadband light source, MSI imaging device, or other type of camera. The imaging device 202 may capture images from a single point of view or capture images from multiple points of view for stereoscopic viewing or rendering a three-dimensional scene. The imaging device 202 may capture images from multiple perspectives using multiple cameras having different viewing perspectives.

The imaging device 202 outputs images 204. In the following description of the system 200, "the images 204" shall be understood as referring to (a) a set of red, green, and blue (RGB) images constituting a single color image; (b) a set of MSI images captured substantially simultaneously (e.g., within 10 milliseconds, 1 milliseconds, or 0.1 milliseconds) and each corresponding to a different band of the electromagnetic spectrum, e.g., infrared, red, green, blue, and ultraviolet, or more or fewer bands of the electromagnetic spectrum; or (c) a set of images captured simultaneously according to another imaging modality. Where the imaging device 202 outputs images from multiple viewing perspectives for stereoscopic viewing or rendering a three-dimensional scene, "the images 204" shall be understood as a set of images according to (a), (b), or (c) as defined in this paragraph that are captured from a single viewing perspective of the multiple viewing perspectives.

Each image of the images 204 corresponds to a different band of wavelengths of the electromagnetic spectrum, whether red light, green light, blue light, infrared, ultraviolet, or some other band of wavelengths. Each image of the images 204 is itself an two-dimensional array of intensity values, i.e. a grayscale image. For example, each image of the images 204 is one or both of (a) captured while the patient's eye 106 was illuminated with light having a peak intensity at a different wavelength than for other images of the images 204 and (b) captured by a sensor having a peak sensitivity at a different wavelength than for other images of the images 204. The wavelengths of the peak intensities or peak sensitivities for the images 204 may be separated by a minimum separation to facilitate capturing different information in each image of the images 204, such as at least 10 nanometers (nm), 20 nm, 30 nm, 40 nm, or a greater difference. The minimum separation between the wavelength of the peak intensities or peak sensitivity for an images 204 and that of the other images 204 may also be expressed as between 1 and 10 percent of the wavelength. The wavelengths the peak intensities and/or peak sensitivities for the images 204 lie within a range of wavelengths with which the retina can be safely illuminated. For example, the range of wavelengths may be from 100 nm to 100 μn. The intensity with which the retina is illuminated while capturing the images 204 is selected to be within limits that will not cause injury.

The images 204 may be represented as separate objects, i.e., separate files or objects stored in memory or a storage device. The images 204 may be represented as a single file or object, e.g., the red, green, and blue fields stored in each pixel value of a color image that may be extracted as red, green, and blue images by the system 200.

The system 200 may include an image weighting stage 206. The weighting stage 206 may perform some or all of the following processing:

Normalize the images 204 such that the maximum and minimum pixel values of the images 204 are the same;

Multiply some or all of the images 204 by a corresponding weight to compensate for the differences in the sensitivity of the camera when capturing each image of the images 204, e.g., compensate for being more sensitive to green light than to read and blue light; and Multiply some or all of the images 204 by a weight that is experimentally selected to enhance visibility of one or more features of the retina represented in the images 204 following processing by the system 100. The manner in which these weights may be determined is described in greater detail below.

Note that in some embodiments, the weighting stage 206 is omitted such that references below to weighted images may be substituted with references to the images 204 as received from the imaging device 202.

The system 200 may include a combination stage 208 in which images, as output by the image weighting stage 206 or the original image 204, are subtracted from one another. For example, let WIr, WIb, and WIg be weighted red, blue, and green images as output by the weighting stage 206. The subtraction stage may calculate some or all of WIrb=WIr–WIb, WIrg=WIr–WIg, WIgb=WIg–WIb, or other combinations or orderings. More complex combinations may include summing and adding, e.g., WIrbg=(WIr+WIg)–Wib or WIrgb=WIr–(WIg+WIb), or some other combination. The weights used at the weighting stage 206 may be selected to enhance visibility of one or more features of the retina following processing by the weighting stage 206.

As used herein, adding and subtraction of images may be understood as pixel-wise addition and subtraction such that for an image A and an image B, a value of a pixel $D(x,y)$ in a difference (or sum) image D is equal to the difference (or sum) of pixel value $A(x,y)$ in image A and a pixel value $B(x,y)$ in image B, where x and y are indexes of values in the two-dimensional arrays of pixels composing the images A, B, and D.

Although the examples described herein reference addition and subtraction, other pixel-wise operations may be performed in a like manner, e.g., $D(x,y)=A(x,y)/B(x,y)$, $D(x,y)=A(x,y)*B(x,y)$, or $D(x,y)=F(A(x,y), B(x,y))$, where F( ) is a mathematical function selected to enhance visibility of retinal features.

Figures 3A, 3B, 3C:
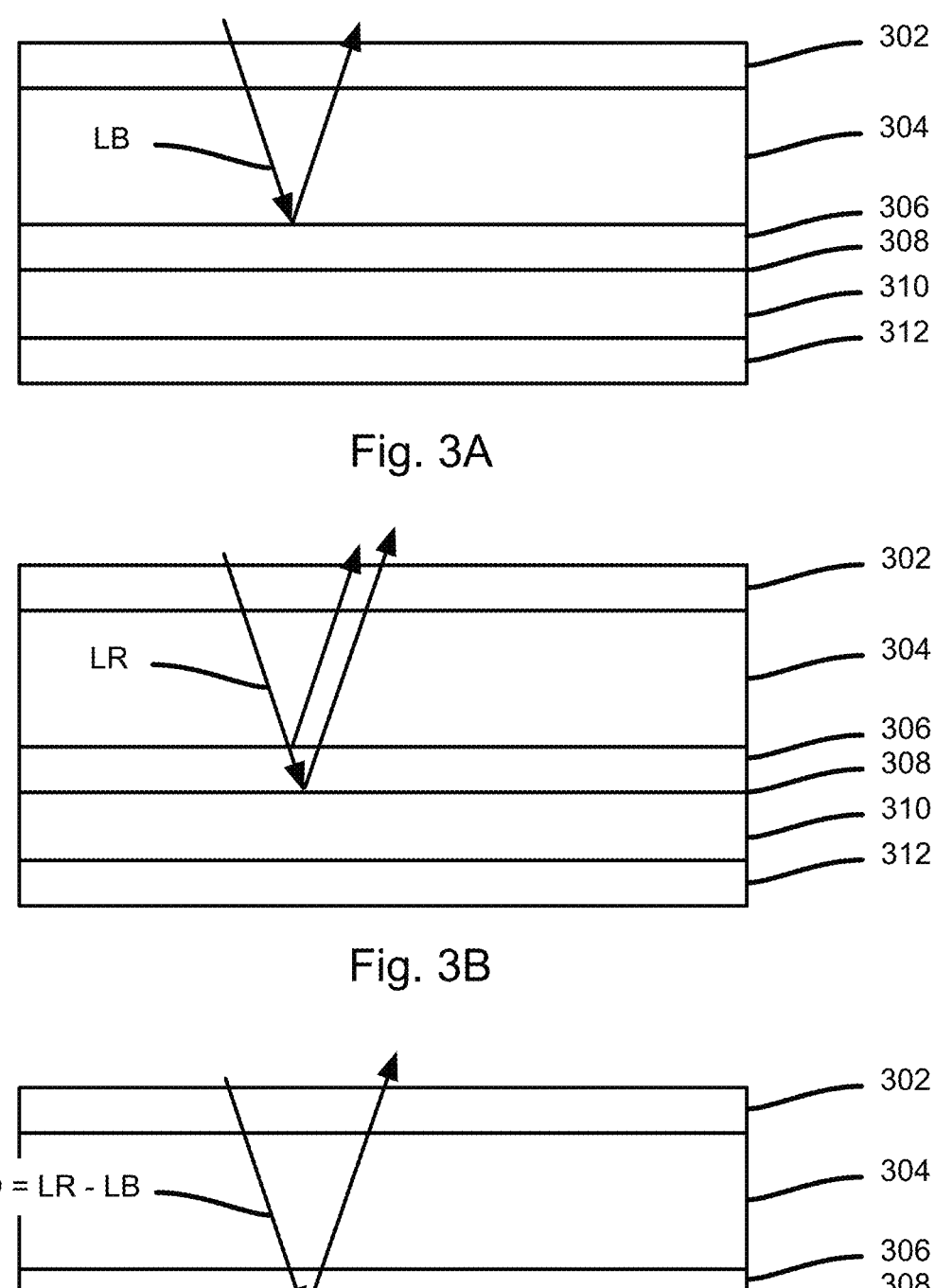
FIGS. 3A, 3B, and 3C are diagrams illustrating reflection of light of various wavelengths from layers of a retina in accordance with certain embodiments.

FIGS. 3A to 3C illustrate a benefit of combination stage 208. The retina of the eye is composed of many layers, including a layer 302 composed of surface nerve fibers and blood vessels, a layer 304 composed of photoreceptors (i.e., rods and cones), the retinal pigment epithelium (RPE) 306, Bruch's membrane 308, choroid 310, and sclera 312. Each of these layers is vascularized and may exhibit physiological changes due to a pathology.

Referring specifically to FIG. 3A, detectable levels of higher wavelength light LB, such as ultraviolet or blue light, will penetrate to a certain depth in the retina and reflect back to a sensor whereas the higher wavelength light LB either does not penetrate further or is absorbed without reflection in deeper layers. In the illustrated example, detectable levels of the light LB only reflect from levels as deep as the RPE 306.

Referring specifically to FIG. 3B, detectable levels of lower wavelength light LR, such as red or infrared light, will penetrate to greater depth relative to the light LB and reflect back to a sensor before being reflected or absorbed. In the illustrated example, detectable levels of the light LR is reflected from the Bruch's membrane 308. The light LR is also reflected from shallower layers of the retina. In many cases, the light reflected from the shallower layers will have greater intensity than light reflected from deeper layers of the retina.

Referring specifically to FIG. 3C, the difference between the reflected light LR and the reflected light LB (LD=LR−LB) will at least partially remove the portion of the light LR reflected from shallower layers and enable visualization of deeper layers. In the illustrated example, light reflected from the surface of the RPE 306 is removed thereby enabling visualization of the RPE 306 itself and the Bruch's membrane 308.

Using the principle illustrated in FIGS. 3A to 3C, variation in the image WIr caused by reflections from relatively deeper layers of the retina may therefore be enhanced by subtracting the image WIb to obtain WIrb=WIr−WIb.

The operation of the image weighting stage 206 and combination stage 208 may be represented according to (1), where $I_{out}$ is the output of the combination stage, W is a vector of weights $W_i$, i=1 to N, and $I_i$, i=1 to N, are the images 204, and N is the number of the images 204, e.g., N=3 for RGB images 204 or a greater number for MSI images 204.

$$I_{out}(W) = \sum_{i=1}^{N} W_i I_i \tag{1}$$

In equation (1), each value $W_i$ can be either 0 (no contribution of image $I_i$ to $I_{out}$), a positive non-zero number (add the image), or a negative non-zero number (subtract the image). The values for W may be selected according to (2), where FOM is a figure-of-merit function that evaluates how well $I_{out}(W)$ for a given value of W represents features of the retina, such as the vasculature, drusen, cotton wool spots, hemorrhaging, internal limiting membrane (ILM), epiretinal membrane (ERM), or other features corresponding to a pathology.

$$W = \underset{W}{\mathrm{argmax}} FOM(I_{out}(W)) \tag{2}$$

Obtaining W according to equation (2) may be performed using any approach for performing optimization, such as Nelder-Mead, Simplex, or other numerical search method.

The figure-of-merit function FOM( ) may evaluate $I_{out}$ (W) based on general metrics of image quality such as contrast and sharpness, such as relative to the images 204 (either before or after processing by the weighting stage 206) from which $I_{out}(W)$ was obtained. Alternatively, the figure-of-merit function FOM( ) may evaluate $I_{out}(W)$ based on a degree of enhancement of known features represented in images 204 processed according to equation (1) for a given value of W.

For example, the images 204 processed to obtain $I_{out}(W)$ may have one or more segmentation masks in which non-zero pixels mark regions in the images 204 representing one or more features of interest that are to be enhanced. The regions may include non-zero pixels only for pixels of the images 204 including the features of interest or may include non-zero pixels for an extended region including both pixels of the images 204 including the features of interest and a region of surrounding pixels, such as in the form of an orthogonal or oriented bounding box. The segmentation masks may be generated by human labelers and may make use of information obtained from sources other than the images 204, such as images 204 from a later stage in progression of a disease when features are more visible, images according to another imaging modality, e.g. optical coherence tomography (OCT) or scanning laser ophthalmoscope (SLO), or some other source.

The figure-of-merit function FOM( ) may evaluate $I_{out}$ (W) with respect to the each segmentation mask and assign an output value of FOM( ) that is a function of some or all of:

Contrast of one or more regions of $I_{out}(W)$ marked by the segmentation mask relative to surrounding pixels; and Pixel intensity of one or more regions of $I_{out}(W)$ marked by the segmentation mask relative to surrounding pixels (score increases with intensity of pixels marked by the segmentation mask and decreases with intensity of pixels that are not marked by the segmentation mask).

The output of the figure-of-merit function FOM( ) may be a function (e.g., sum) of values obtained for multiple segmentation masks with respect to $I_{out}(W)$. Likewise, the output of the figure-of-merit function FOM( ) may be a function (e.g., sum) of values obtained by processing one or more segmentation masks for one or more sets of images 204.

Multiple weight vectors W may be obtained, e.g., one weight vector for enhancing visualization of each pathology of a plurality of pathologies, one weight vector for enhancing visualization of each feature of a plurality of features (vascularization, hemorrhaging, drusen, ILM, ERM, etc.), and/or one weight vector for enhanced imaging of each layer or group of layers within the retina (e.g., any of the layers 302-312). Each weight vector W may therefore be obtained using one or more sets of images 204 and corresponding segmentation masks corresponding to the pathology or feature to be enhanced using the weight vector W.

Examples of pathologies for which a vector W may be generated may include any of the pathologies listed below and/or features of the retina that correspond to any of the below-listed pathologies:

Retinal tear(s)
Retinal detachment
Diabetic retinopathy
Hypertensive retinopathy
Sickle cell retinopathy
Central retinal vein occlusion
Epiretinal membrane
Macular hole(s)
Macular degeneration (including age-related Macular Degeneration)
Retinal pigmentosa
Glaucoma
Alzheimer's disease
Parkinson's disease An image $I_{out}(W)$ output by the combination stage 208 may be used in various ways. In some embodiments, only $I_{out}(W)$ is displayed to a surgeon or operator. In other embodiments, the image $I_{out}(W)$ is processed by a feature extraction stage 212. The feature extraction stage 212 may be a machine vision algorithm or machine learning model that outputs one or more segmentation masks labeling portions of $I_{out}(W)$ corresponding one or more features or pathologies. Where implemented as a machine learning model, the feature extraction stage 212 may be implemented as a neural network, deep neural network (DNN), convolution neural network (CNN), recurrent neural network (RNN), region-based CNN (R-CNN), autoencoder (AE) or other type of neural network. The feature extraction stage may additionally take as inputs some or all of the images 204 and the weighted images as output from the weighting stage 206.b In some embodiments, an operator interface 210 receives some or all of, the images 204, $I_{out}(W)$, and segmentation masks from the feature extraction stage 212. The operator interface 210 may further receive user inputs from an operator, such as a surgeon. The operator interface 210 may receive and execute instructions to perform some or all of the following tasks:

Display only the images 204 (i.e., a combination of the images 204 into a single RGB or MSI image);

Display the images 204 along with one or more of the segmentation masks superimposed thereon, e.g., a segmentation mask selected by the operator. The segmentation mask may be displayed as pixels having a highly recognizable color (red, black, purple, etc.);

Display $I_{out}(W)$;

Display $I_{out}(W)$ superimposed on one or more of the images 204, e.g., added to the red pixels of an RGB color image to enhance visualization of vasculature or hemorrhaging;

Display $I_{out}(W)$ (alone or superimposed on the images 204) for a weight vector W of a plurality of weight vectors corresponding to a selection received from the operator, e.g., a weight vector W selected to enhance visualization of a feature or pathology of interest to the operator; and Superimpose a segmentation map on any of the above-described options for features identified by the feature extraction stage 212, such as in response to a selection from among a plurality of segmentation maps representing a plurality of types of features (vasculature, hemorrhaging, drusen, ILM, ERM, etc.), a plurality of layers or groups of layers within the retina, and/or a plurality of pathologies.

The system 200 may display whichever of the above-described images is selected by the operator on a display device 214, such as any of the display devices described above with respect to FIG. 1 or some other display device. The operator interface 210 may receive instructions from the operator as to what image to display by means of a touch screen implementing one of the imaging devices described above with respect to FIG. 1, a keyboard, mouse, voice command, gesture detected by a camera, or other input device.

Figures 4A, 4B:
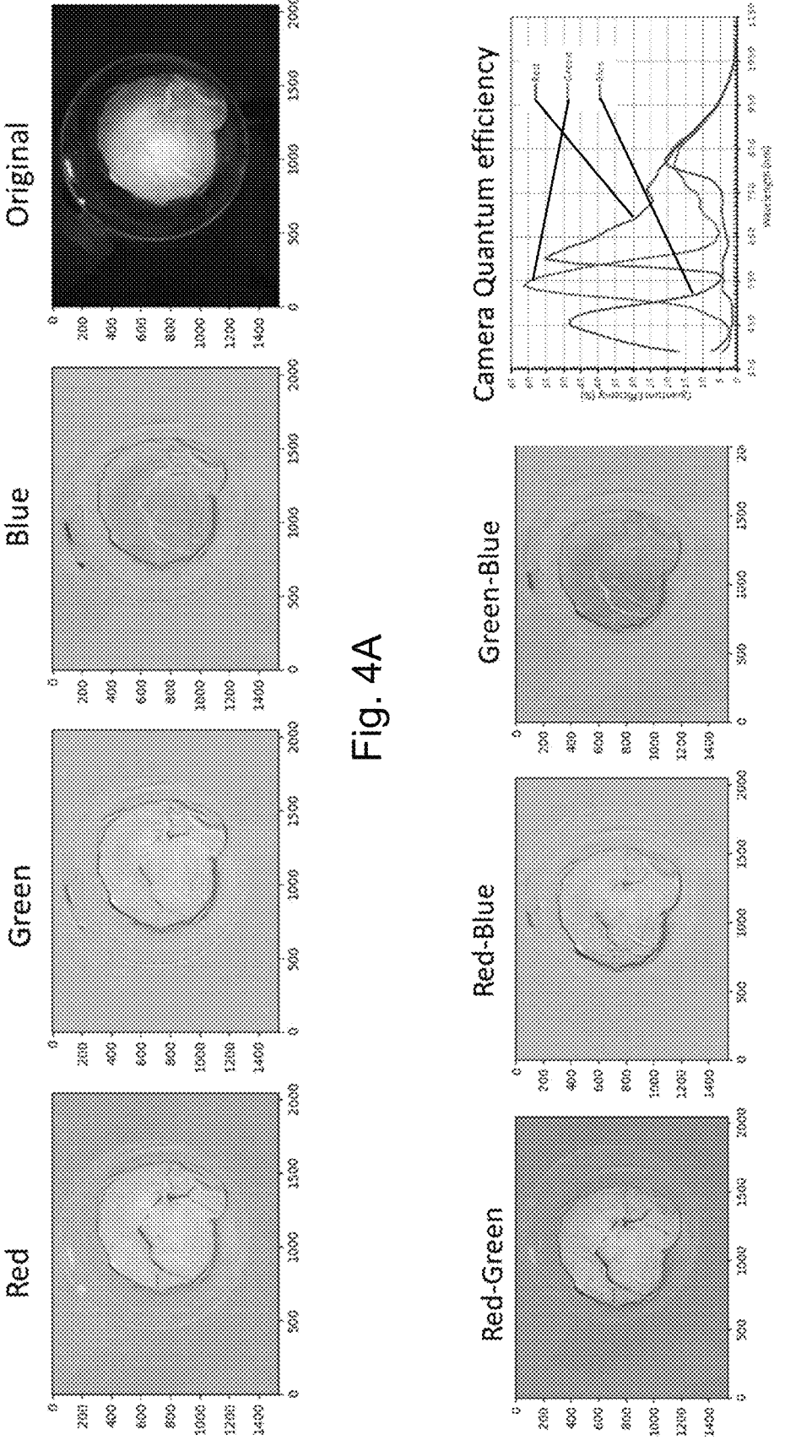
FIG. 4A includes images of a sample of a retina for various wavelengths.
FIG. 4B includes difference images obtained from the images of the retina in accordance to certain embodiments.

FIGS. 4A and 4B illustrate example images that may be obtained using the system 200. FIG. 4A illustrates the red, green, and blue images that constitute an original RGB image captured of a sample from a retina. FIG. 4B illustrates difference images: Red-Green, Red-Blue, and Green-Blue. As is apparent, features such as veins are highly visible, particularly in the Red-Green image.

FIG. 4B further includes a plot of camera quantum efficiency of a typical digital camera. As is apparent, the peak sensitivity of each sensor (red, green, and blue) is not equal. Accordingly, this variation in peak sensitivity may be accounted for by the weighting stage 206.

Figure 5:
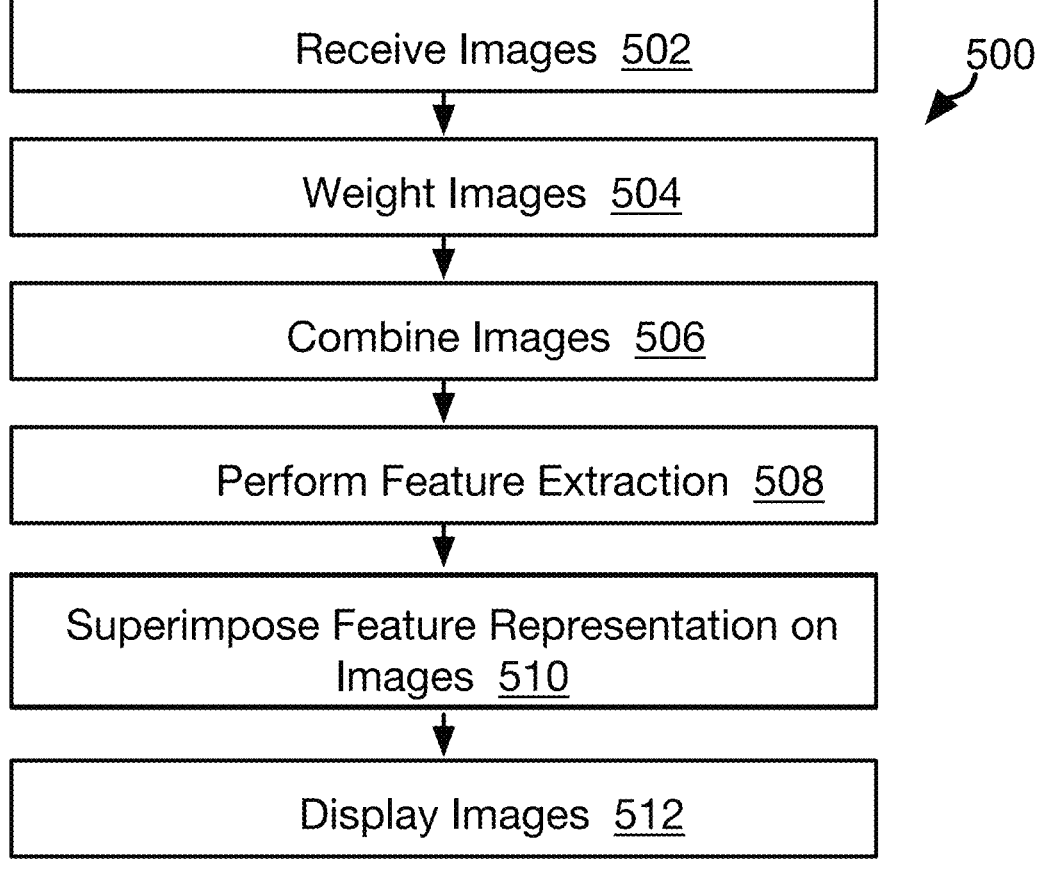
FIG. 5 is a process flow diagram of a method for enhanced ophthalmic visualization in accordance with certain embodiments.

FIG. 5 illustrates an example method for processing images 204 as defined above. The method 500 may be implemented by the system 200. The system 200 itself may be implemented using computing capacity of an imaging device 202 or a computing device that receives images from the imaging device 202.

The method 500 includes receiving, at step 502, the images 204 from the imaging device 202 and weighting, at step 504, the images 204 to obtain weighted images. Weighting may include some or all of normalizing, compensating for differences in camera sensitivity, and multiplying by weights to enhance visibility of features. The weighted images may then be combined to obtain a combined image, at step 506, by adding, subtracting, multiplying, or implementing some other operation with respect to two or more of the images 204. Steps 504 and 506 may be implemented according to equation (1) as described above to obtain the $I_{out}(W)$ as the combined image.

The method 500 may include performing, at step 508, feature extraction with respect to the combined image. Feature extraction may include processing the combined image using a machine learning model or machine vision algorithm as described above with respect to the feature extraction stage 212.

The method 500 may include superimposing, at step 510, a representation of features identified at step 508, e.g., a segmentation mask onto one or more of the images 204, the combined image, or any of the options described above. The result of the superimposition of step 510 may then be displayed on a display device at step 512. Note that in some embodiments, the feature extraction and superimposition steps 508, 510 are omitted and the combined image is displayed alone or superimposed on the images 204.

Where stereoscopic imaging or three-dimensional rendering is used, step 512 may use the results of processing two or more sets of images from two or more different camera viewpoints according to the method 500 and using a combined image or result of the superimposition for each of the two or more sets of images to provide a stereoscope view or three-dimensional rendering.

Step 512 may be performed repeatedly or periodically during surgery to provide real time feedback to a surgeon. For example, step 512 may be performed to provide feedback for membrane peeling (ILM, ERM) by enhancing visibility of the portion of the membrane that remains to be peeled and/or detecting pulling on other layers of the retina. Step 512 may be used to assess the state of the retina while performing a vitrectomy, pneumatic retinopexy, scleral buckle, or other ophthalmic surgery.

Step 512 may be used to diagnose pathologies. Images having features enhanced or labeled as described above may be displayed to a surgeon to enable the diagnosis of any of the above-listed pathologies. Such images captured at two or more different points in time may be analyzed by a human operator or machine learning model to assess the change in features (e.g., growth of drusen, changes in vasculature, etc.).

Figure 6:
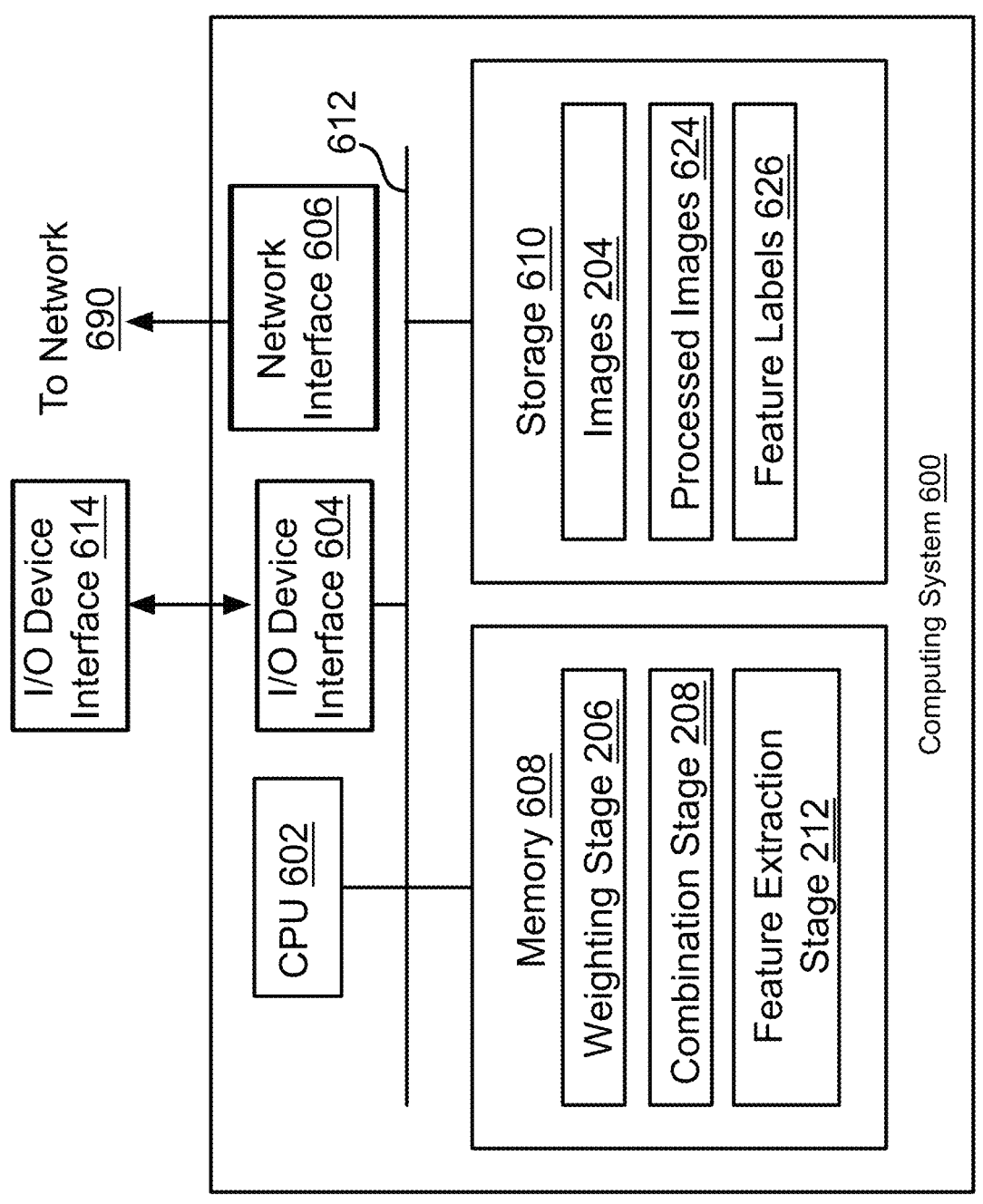
FIG. 6 illustrates an example computing device that implements, at least partly, one or more functionalities for implementing enhanced ophthalmic visualization in accordance with certain embodiments.

FIG. 6 illustrates an example computing system 600 that implements, at least partly, one or more functionalities described herein with respect to FIGS. 2 and 5. The computing system 600 may be integrated with an imaging device capturing images according to one or more of the imaging modalities described herein or may be a separate computing device.

As shown, computing system 600 includes a central processing unit (CPU) 602, one or more I/O device interfaces 604, which may allow for the connection of various I/O devices 614 (e.g., keyboards, displays, mouse devices, pen input, etc.) to computing system 600, network interface 606 through which computing system 600 is connected to network 690, a memory 608, storage 610, and an interconnect 612.

In cases where computing system 600 is an imaging system, such the SLO, an OCT, or fundus camera, the computing system 600 may further include one or more optical components for obtaining ophthalmic imaging of a patient's eye as well as any other components known to one of ordinary skill in the art.

CPU 602 may retrieve and execute programming instructions stored in the memory 608. Similarly, CPU 602 may retrieve and store application data residing in the memory 608. The interconnect 612 transmits programming instructions and application data, among CPU 602, I/O device interface 604, network interface 606, memory 608, and storage 610. CPU 602 is included to be representative of a single CPU, multiple CPUs, a single CPU having multiple processing cores, and the like.

Memory 608 is representative of a volatile memory, such as a random access memory, and/or a nonvolatile memory, such as nonvolatile random access memory, phase change random access memory, or the like. As shown, memory 608 may store executable code implementing the weighting stage 206, combination stage 208, and/or feature extraction stage 212.

Storage 610 may be non-volatile memory, such as a disk drive, solid state drive, or a collection of storage devices distributed across multiple storage systems. Storage 610 may optionally store the images 204 or processed versions 624 of the images 204 resulting from weighting, combining, or other processing described herein. The storage 610 may also store feature labels 626 extracted from the processed images 204 as described herein, such as segmentation maps obtained from a combined image as described above.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middle-ware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a trans-mission line, a carrier wave modulated by data, and/or a computer readable storage medium with instructions stored thereon separate from the wireless node, all of which may be accessed by the processor through the bus interface. Alter-natively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Program-mable Read-Only Memory), EPROM (Erasable Program-mable Read-Only Memory), EEPROM (Electrically Eras-able Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execu-tion of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing dis-closed herein is intended to be dedicated to the public regardless of whether such disclosure is explicitly recited in the claims.

What is claimed is:

1. An ophthalmic visualization system comprising:
one or more processing devices and one or more memory devices coupled to the one or more processing devices, the one or more memory devices storing executable code that, when executed by the one or more processing devices, causes the one or more processing devices to:
receive a plurality of images of an eye of a patient obtained using a multi-spectral imaging MSI) device, each image corresponding to a different portion of an electromagnetic spectrum;
obtain a combined image by performing pixel-wise com-bination of two or more images of the plurality of images; and
output a representation of the combined image to a display device, comprising:
process the combined image to obtain a segmentation mask identifying one or more features represented in the combined image; and
superimpose the segmentation mask onto one of (a) one or more of the plurality of images and (b) the combined image to obtain the representation of the combined image.

2. The ophthalmic visualization system of claim 1, wherein the plurality of images include red, green, and blue images constituting a color image.

3. The ophthalmic visualization system of claim 1, wherein the plurality of images include an infrared image.

4. The ophthalmic visualization system of claim 1, wherein, when executed by the one or more processing devices, the executable code further causes the one or more processing devices to obtain the combined image by per-forming pixel-wise subtraction of one or more first images of the plurality of images from one or more second images of the plurality of images.

5. The ophthalmic visualization system of claim 1, wherein, when executed by the one or more processing devices, the executable code further causes the one or more processing devices to obtain the combined image by weight-ing the two or more images with two or more weights to obtain two or more weighted images and obtaining a pixel-wise combination of the two or more weighted images.

6. The ophthalmic visualization system of claim 5, wherein the two or more weights are selected to enhance representation of one or more features selected from the group consisting of vasculature, drusen, hemorrhaging, and cotton wool spots.

7. The ophthalmic visualization system of claim 5, wherein the two or more weights are selected to enhance representation of one or more layers of a retina in the eye of the patient.

8. The ophthalmic visualization system of claim 5, wherein the two or more weights are selected to enhance representation of one or more features corresponding to a pathology selected from the group consisting of:
Retinal tear(s);
Retinal detachment;
Diabetic retinopathy;
Hypertensive retinopathy;
Sickle cell retinopathy;

Central retinal vein occlusion;

Epiretinal membrane;

Macular hole(s);

Macular degeneration (including age-related Macular Degeneration);

Retinal pigmentosa;

Glaucoma;

Alzheimer's disease;

Parkinson's disease.

9. A ophthalmic visualization method comprising:

receiving, by a computing device, a plurality of images of an eye of a patient obtained using a multi-spectral imaging (MSI) device, each image corresponding to a different portion of an electromagnetic spectrum;

obtaining, by the computing device, a combined image by performing pixel-wise combination of two or more images of the plurality of images; and outputting, by the computing device, a representation of the combined image to a display device, comprising:

processing the combined image to obtain a segmentation mask identifying one or more features represented in the combined image; and superimposing the segmentation mask onto one of (a) one or more of the plurality of images and (b) the combined image to obtain the representation of the combined image.

10. The ophthalmic visualization method of claim 9, wherein the plurality of images include red, green, and blue images constituting a color image.

11. The ophthalmic visualization method of claim 9, wherein the plurality of images include an infrared image.

12. The ophthalmic visualization method of claim 9, further comprising performing, by the computing device, pixel-wise subtraction of one or more first images of the plurality of images from one or more second images of the plurality of images to obtain the combined image.

13. The ophthalmic visualization method of claim 9, further comprising:

weighting, by the computing device, the two or more images with two or more weights to obtain two or more weighted images; and performing, by the computing device, a pixel-wise combination of the two or more weighted images to obtain the combined image.

14. The ophthalmic visualization method of claim 13, wherein the two or more weights are selected to enhance representation of one or more features selected from the group consisting of vasculature, drusen, hemorrhaging, and cotton wool spots.

15. The ophthalmic visualization method of claim 13, wherein the two or more weights are selected to enhance representation of one or more layers of a retina in the eye of the patient.

16. The ophthalmic visualization method of claim 13, wherein the two or more weights are selected to enhance representation of one or more features corresponding to a pathology selected from the group consisting of:

Retinal tear(s);

Retinal detachment;

Diabetic retinopathy;

Hypertensive retinopathy;

Sickle cell retinopathy;

Central retinal vein occlusion;

Epiretinal membrane;

Macular hole(s);

Macular degeneration (including age-related Macular Degeneration);

Retinal pigmentosa;

Glaucoma;

Alzheimer's disease; or

Parkinson's disease.

\* \* \* \* \*